(12) United States Patent
Liu et al.

(10) Patent No.: US 11,867,435 B2
(45) Date of Patent: Jan. 9, 2024

(54) REVERSIBLE THERMAL MANAGEMENT DEVICE FOR A MOTOR VEHICLE

(71) Applicant: Valeo Systemes Thermiques, Le Mesnil-Saint-Denis (FR)

(72) Inventors: Jin-Ming Liu, Le Mesnil Saint Denis (FR); Mohamed Yahia, Le Mesnil Saint Denis (FR); Bertrand Nicolas, Le Mesnil Saint Denis (FR); Roland Akiki, Le Mesnil Saint Denis (FR)

(73) Assignee: Valeo Systemes Thermiques, Le Mesnil Saint-Denis (FR)

( * ) Notice: Subject to any disclaimer, the term of this patent is extended or adjusted under 35 U.S.C. 154(b) by 411 days.

(21) Appl. No.: 17/293,683

(22) PCT Filed: Nov. 15, 2019

(86) PCT No.: PCT/FR2019/052715
§ 371 (c)(1),
(2) Date: May 13, 2021

(87) PCT Pub. No.: WO2020/099798
PCT Pub. Date: May 22, 2020

(65) Prior Publication Data
US 2022/0001721 A1 Jan. 6, 2022

(30) Foreign Application Priority Data
Nov. 16, 2018 (FR) ...................... 1860650

(51) Int. Cl.
*B60H 1/00* (2006.01)
*F25B 29/00* (2006.01)
(Continued)

(52) U.S. Cl.
CPC ....... *F25B 29/003* (2013.01); *B60H 1/00664* (2013.01); *B60H 1/00921* (2013.01);
(Continued)

(58) Field of Classification Search
CPC ........ F25B 29/003; F25B 41/20; F25B 41/22; F25B 41/24; F25B 2400/0409;
(Continued)

(56) References Cited

U.S. PATENT DOCUMENTS 5,605,051 A 2/1997 Iritani et al.

FOREIGN PATENT DOCUMENTS

DE 112012000758 T5 11/2013
EP 2479506 A1 7/2012
(Continued)

OTHER PUBLICATIONS

International Search Report and Written Opinion in corresponding International Application No. PCT/FR2019/052715, dated Mar. 31, 2020 (11 pages).

*Primary Examiner* — Emmanuel E Duke
(74) *Attorney, Agent, or Firm* — Osha Bergman Watanabe & Burton LLP

(57) ABSTRACT

A reversible thermal management device for a motor vehicle includes a refrigerant fluid circuit containing a main loop which has, successively, a compressor, an internal condenser, a first expansion device and an external evaporator/condenser. The device also has a three bypass branches. The third bypass branch has a heat exchanger. The device further includes a device for redirecting the refrigerant fluid coming from the internal condenser towards the first expansion device or the first bypass branch, a stop valve for the refrigerant fluid, arranged on the main loop, a first check valve arranged on the second bypass branch to block the refrigerant fluid coming from the internal condenser, a second check valve arranged on the main loop to block the refrigerant fluid coming from the evaporator/condenser, and (Continued)

Figure 1:
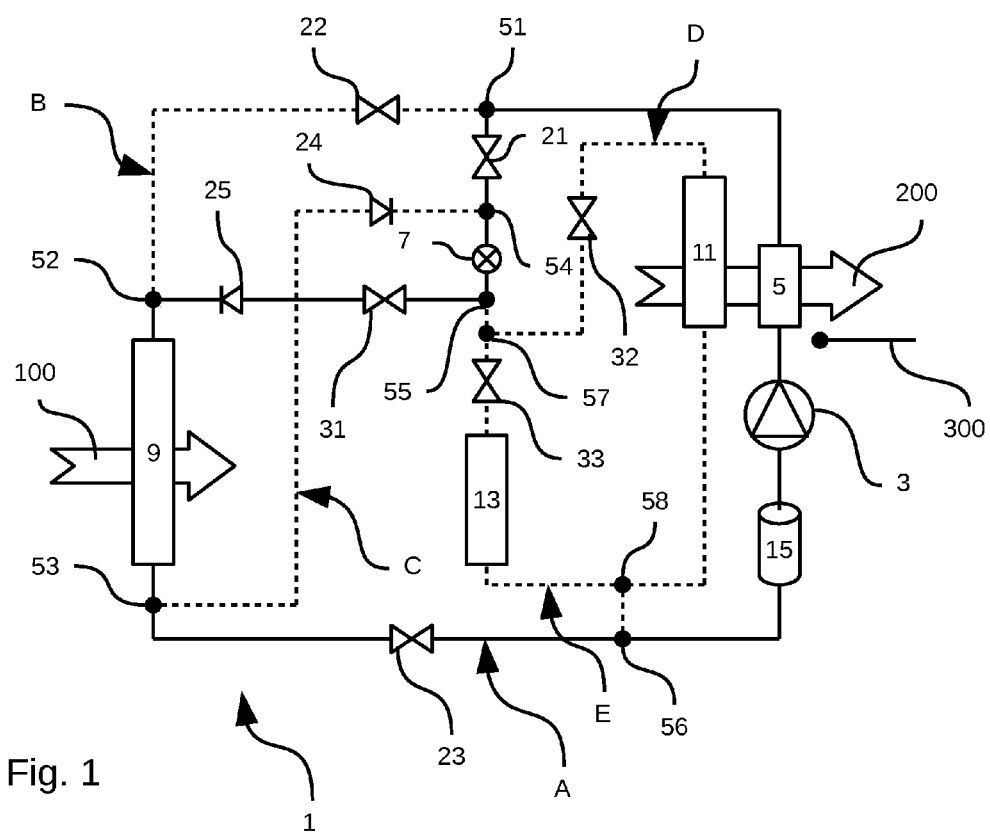

a device for redirecting fluid coming from the first expansion device towards the heat exchanger of the third bypass branch or the evaporator/condenser.

10 Claims, 11 Drawing Sheets

(51) Int. Cl.
*F25B 41/20* (2021.01)
*F25B 41/24* (2021.01)
*F25B 41/22* (2021.01)

(52) U.S. Cl.
CPC .............. *F25B 41/20* (2021.01); *F25B 41/22* (2021.01); *F25B 41/24* (2021.01); *B60H 2001/00928* (2013.01); *B60H 2001/00949* (2013.01)

(58) Field of Classification Search
CPC .......... F25B 2400/0411; F25B 2500/05; F25B 13/00; B60H 1/00664; B60H 1/00921; B60H 2001/00928; B60H 2001/00949
See application file for complete search history.

(56) References Cited

FOREIGN PATENT DOCUMENTS

| | | | | |
|---|---|---|---|---|
| EP | 3263374 A1 | * | 1/2018 | ......... B60H 1/00921 |
| WO | WO-2017212158 A1 | * | 12/2017 | ......... B60H 1/00907 |
| WO | WO-2018051038 A1 | * | 3/2018 | ......... B60H 1/00921 |

* cited by examiner

REVERSIBLE THERMAL MANAGEMENT DEVICE FOR A MOTOR VEHICLE

The invention relates to the field of motor vehicles and more particularly to a reversible thermal management device for a motor vehicle.

Present-day motor vehicles increasingly comprise a thermal management device. In general, in a "conventional" thermal management device, a refrigerant fluid circulates in an air-conditioning circuit and passes successively through a compressor, a first heat exchanger known as a condenser, which is in contact with an air flow outside the motor vehicle in order to release heat, an expansion device and a second heat exchanger known as an evaporator, which is in contact with an internal air flow of the motor vehicle in order to cool same.

There are also more complicated air-conditioning circuit architectures that make it possible to obtain a reversible thermal management device, i.e. one which can use a heat-pump operating mode in which it is able to absorb heat energy from the external air at the first heat exchanger, then known as an evaporator-condenser, and release it into the passenger compartment, in particular by means of a dedicated third heat exchanger.

This is possible in particular using a dedicated internal condenser arranged in the internal air flow, which allows heating of said internal air flow.

The thermal management device may also comprise one or more heat exchangers, generally arranged in parallel with the evaporator, in order for example to cool elements such as batteries in a hybrid or electric vehicle.

The thermal management device thus generally comprises a dedicated expansion device upstream of each heat exchanger. Such an architecture is not suitable since it requires as many expansion devices as heat exchangers able to act as evaporators, and is therefore costly.

One of the aims of the present invention is therefore to overcome at least some of the drawbacks of the prior art and propose an improved and less costly thermal management device.

The present invention therefore concerns a reversible thermal management device for a motor vehicle, said thermal management device having a refrigerant fluid circuit in which a refrigerant fluid circulates, and containing:
- a main loop which comprises successively a compressor, an internal condenser, a first expansion device and an external evaporator/condenser,
- a first bypass branch connecting a first connection point arranged on the main loop upstream of the first expansion device, between said first expansion device and the internal condenser, to a second connection point arranged on the main loop upstream of the external evaporator/condenser, between said external evaporator/condenser and the first expansion device,
- a second bypass branch connecting a third connection point arranged on the main loop downstream of the external evaporator/condenser, between said external evaporator/condenser and the compressor, to a fourth connection point arranged on the main loop upstream of the first expansion device, between said first expansion device and the first connection point,
- a third bypass branch connecting a fifth connection point arranged on the main loop downstream of the first expansion device, between said first expansion device and the second connection point, to a sixth connection point arranged on the main loop upstream of the compressor, between said compressor and the third connection point, said third bypass branch comprising at least one heat exchanger,
- a device for redirecting the refrigerant fluid coming from the internal condenser towards the first expansion device or towards the first bypass branch,
- a stop valve for the refrigerant fluid, arranged on the main loop between the third and the sixth connection points,
- a first check valve arranged on the second bypass branch so as to block the refrigerant fluid coming from the internal condenser,
- a second check valve arranged on the main loop between the second and the fifth connection points, so as to block the refrigerant fluid coming from the evaporator/condenser,
- a device for redirecting the refrigerant fluid coming from the first expansion device towards the at least one heat exchanger of the third bypass branch or towards the evaporator/condenser.

According to an aspect of the invention, the device for redirecting refrigerant fluid coming from the first expansion device comprises:
- a first stop valve arranged on the main loop upstream of the evaporator/condenser, between the fifth connection point and the second check valve,
- at least one other stop valve arranged on the third bypass branch upstream of the at least one heat exchanger, between the fifth connection point and the at least one heat exchanger.

According to another aspect of the invention, the third bypass branch comprises an internal evaporator, and the reversible thermal management device comprises a fourth bypass branch containing a cooler, said fourth bypass branch connecting a seventh connection point arranged on the third bypass branch downstream of the fifth connection point, between said fifth connection point and the internal evaporator, to an eighth connection point arranged on the third bypass branch upstream of the sixth connection point, between said sixth connection point and the internal evaporator, the device for redirecting refrigerant fluid coming from the first expansion device being configured to redirect the fluid towards the evaporator/condenser or towards the internal evaporator and/or the cooler.

According to another aspect of the invention, the device for redirecting refrigerant fluid coming from the first expansion device comprises:
- a second stop valve arranged on the third bypass branch upstream of the internal evaporator, between said internal evaporator and the seventh connection point, and
- a third stop valve arranged on the fourth bypass branch upstream of the cooler, between said cooler and the seventh connection point.

According to another aspect of the invention, the reversible thermal management device comprises a heating, ventilation and air conditioning device inside which an internal air flow is designed to circulate in the direction of the passenger compartment, the internal evaporator and the internal condenser being arranged in said heating, ventilation and air conditioning device, said internal evaporator being arranged upstream of the internal condenser in the circulation direction of the internal air flow.

According to another aspect of the invention, the heating, ventilation and air conditioning device comprises a flap arranged so as to block the internal air flow so that it does not pass through the internal condenser.

According to another aspect of the invention, the reversible thermal management device comprises an internal heat exchanger, said internal heat exchanger being arranged firstly on the second bypass branch downstream of the first check valve, between said first check valve and the fourth connection point, and secondly on the main loop upstream of the compressor, between said compressor and the sixth connection point.

According to another aspect of the invention, the device for redirecting refrigerant fluid coming from the first expansion device is controlled by a pulse width modulation signals.

According to another aspect of the invention, the reversible thermal management device comprises a second expansion device arranged on the third bypass branch downstream of the at least one heat exchanger.

According to another aspect of the invention, the reversible thermal management device furthermore comprises:
- a device for blocking the refrigerant fluid, arranged on the third bypass branch downstream of the at least one heat exchanger,
- a fifth bypass branch connecting a ninth connection point arranged on the third bypass branch between the blocking device and the at least one heat exchanger, to a tenth connection point arranged on the second connection branch between said first check valve and the third connection point, said fifth bypass branch comprising a third check valve so as to block the refrigerant fluid coming from the tenth connection point,
- a fourth check valve arranged on the second bypass branch between the third and the tenth connection points, so as to block the refrigerant fluid coming from the tenth connection point,
- a sixth bypass branch connecting an eleventh connection point arranged on the second bypass branch between the tenth connection point and the first check valve, to a twelfth connection point arranged on the main loop downstream of the second check valve, between said second check valve and the second connection point, said sixth bypass branch comprising a fifth check valve so as to block the refrigerant fluid coming from the twelfth connection point,
- a third expansion device arranged on the second bypass branch between the tenth and eleventh connection points.

Figure 6A:
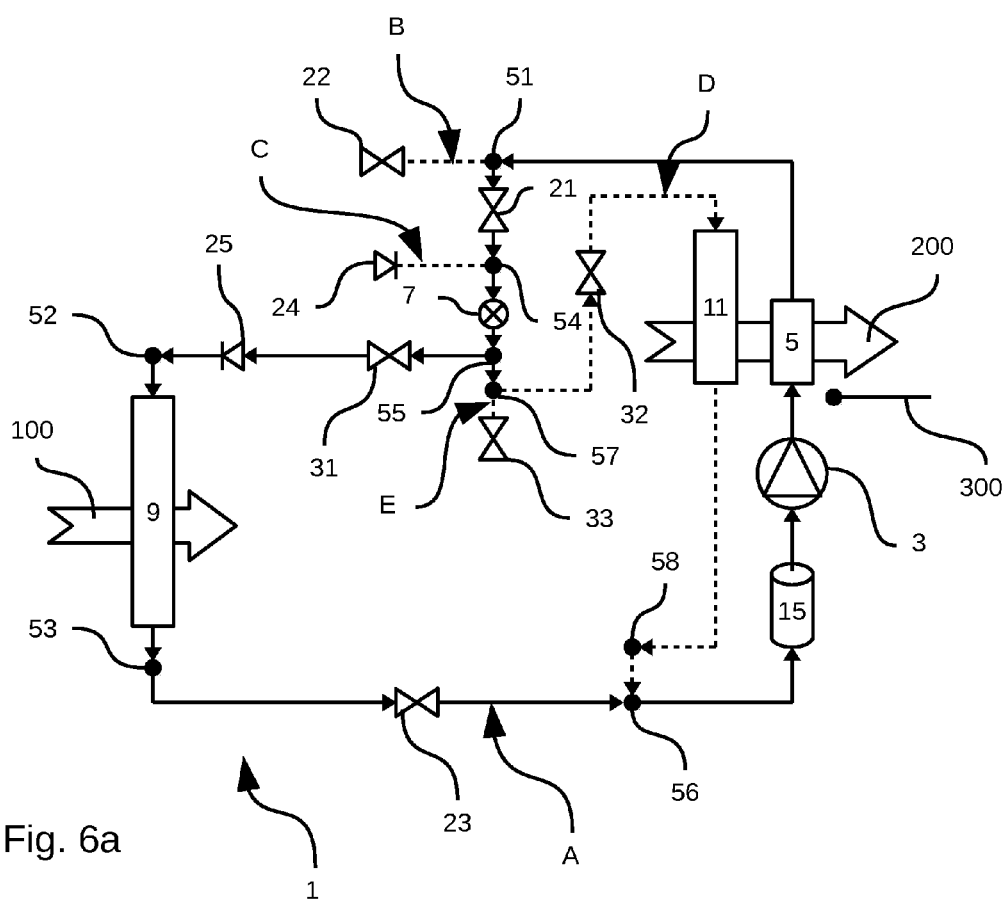
Figure 6B:
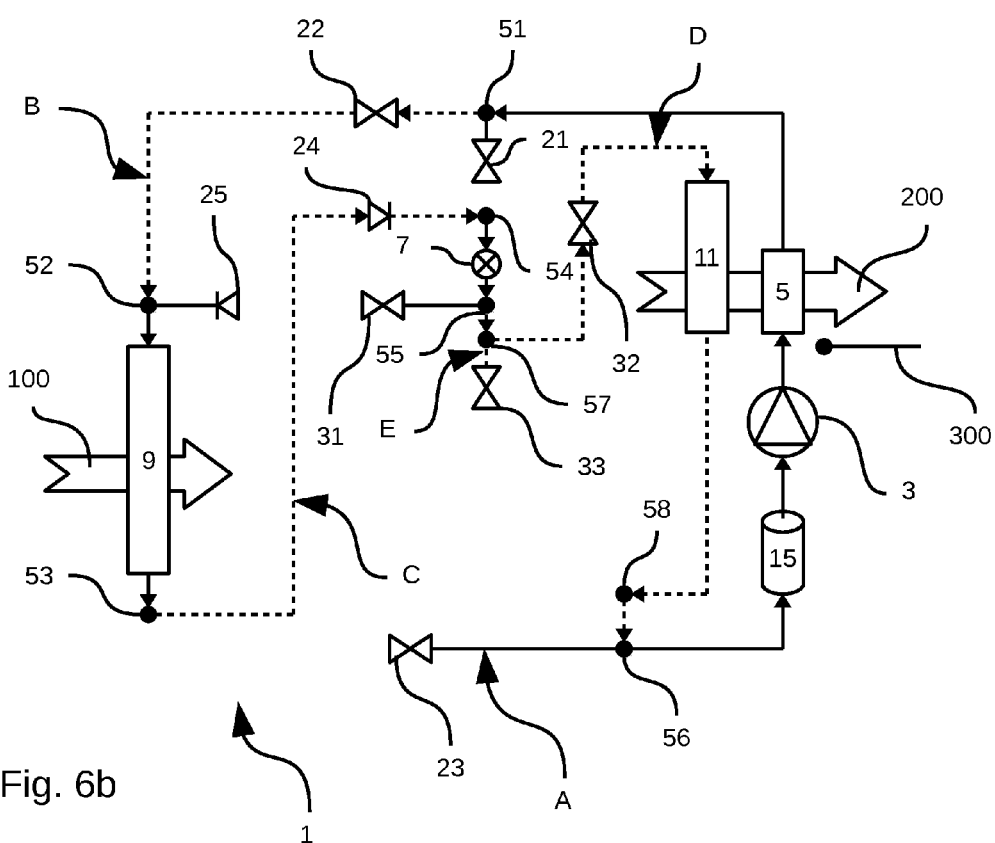
Figure 7:
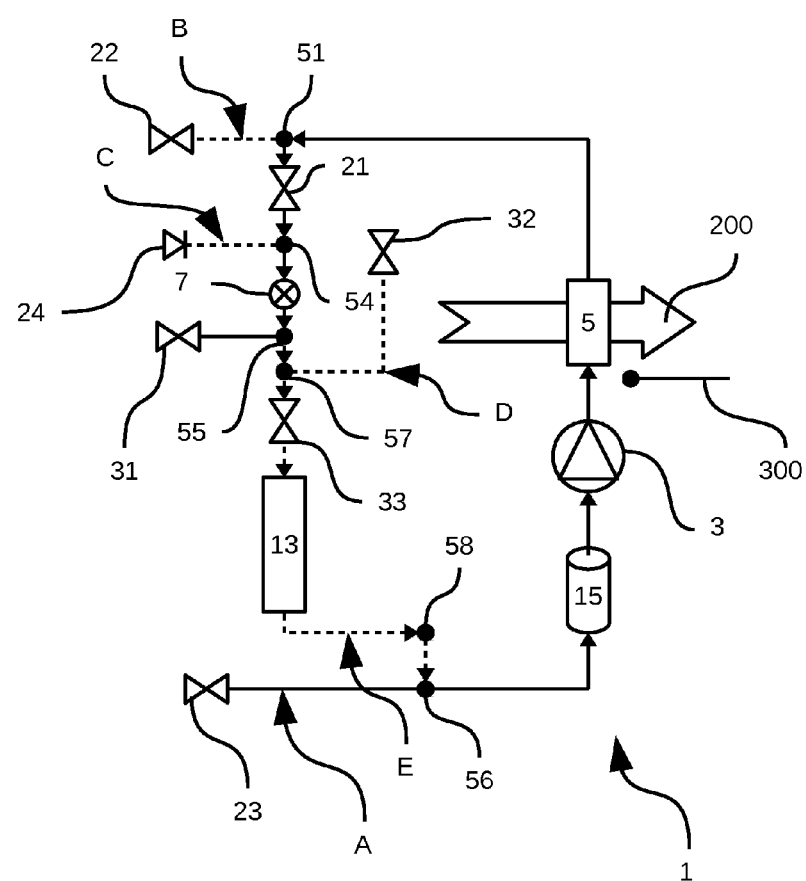
Figure 8:
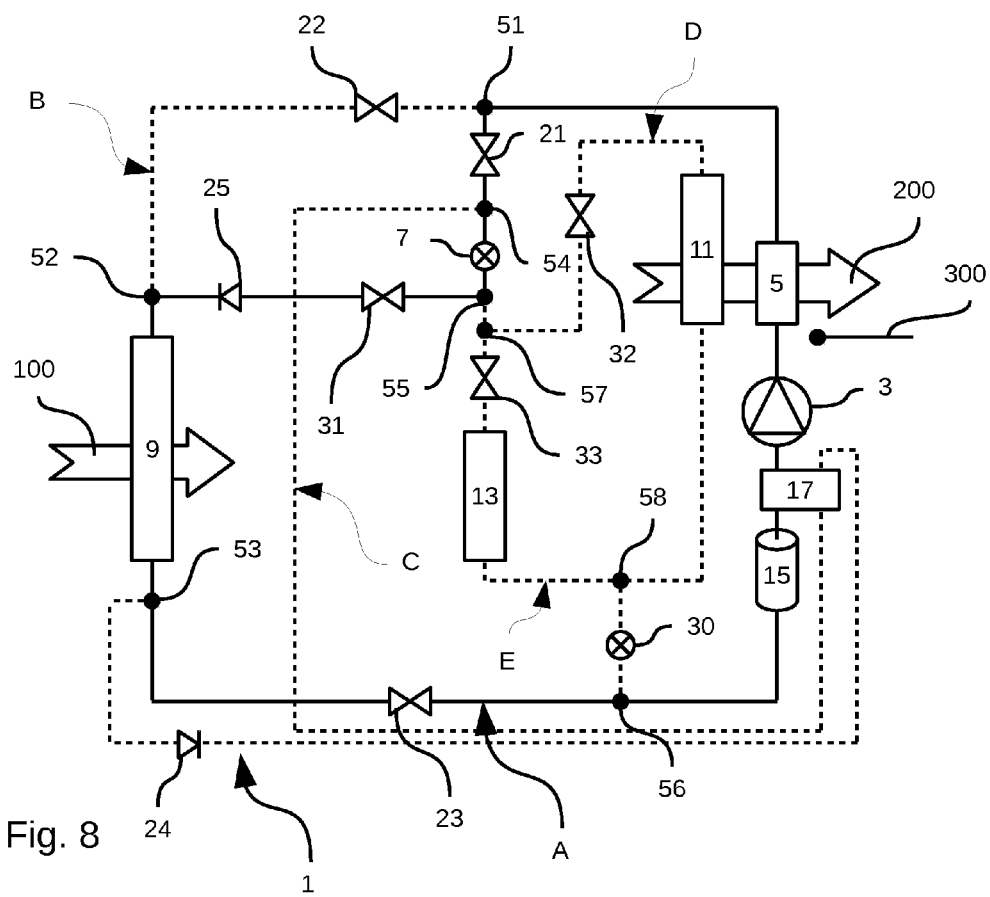
Figure 9:
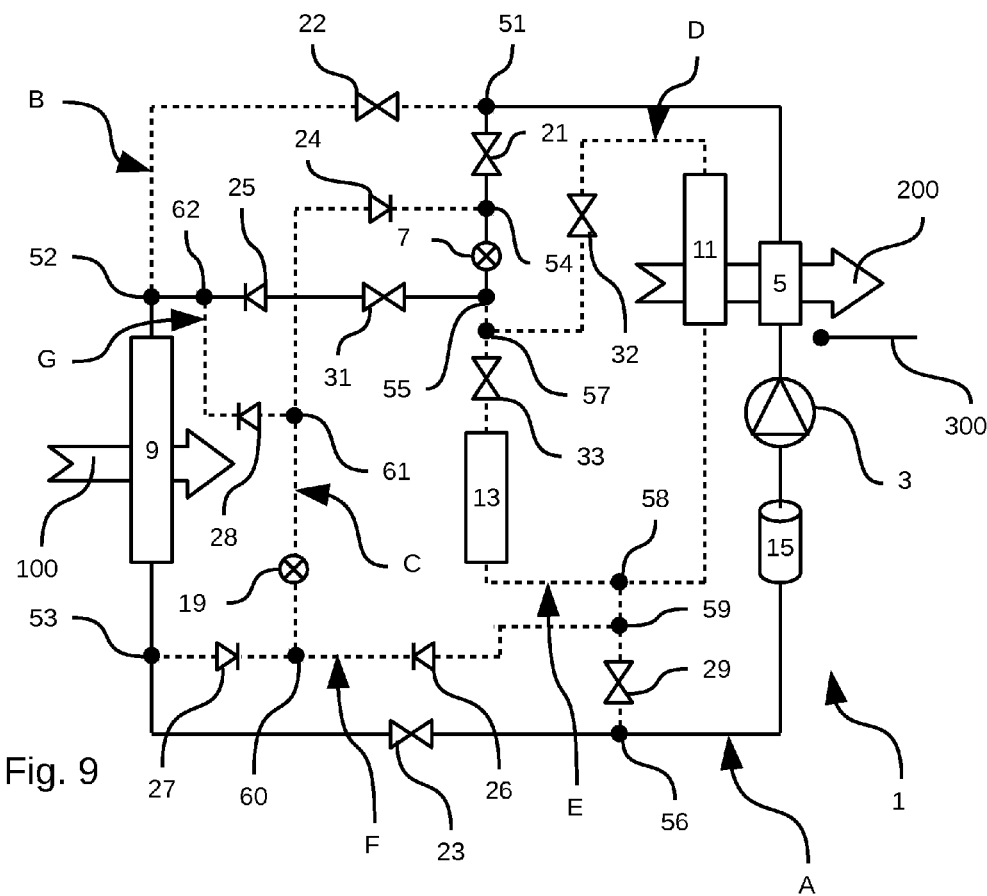
Figure 10:
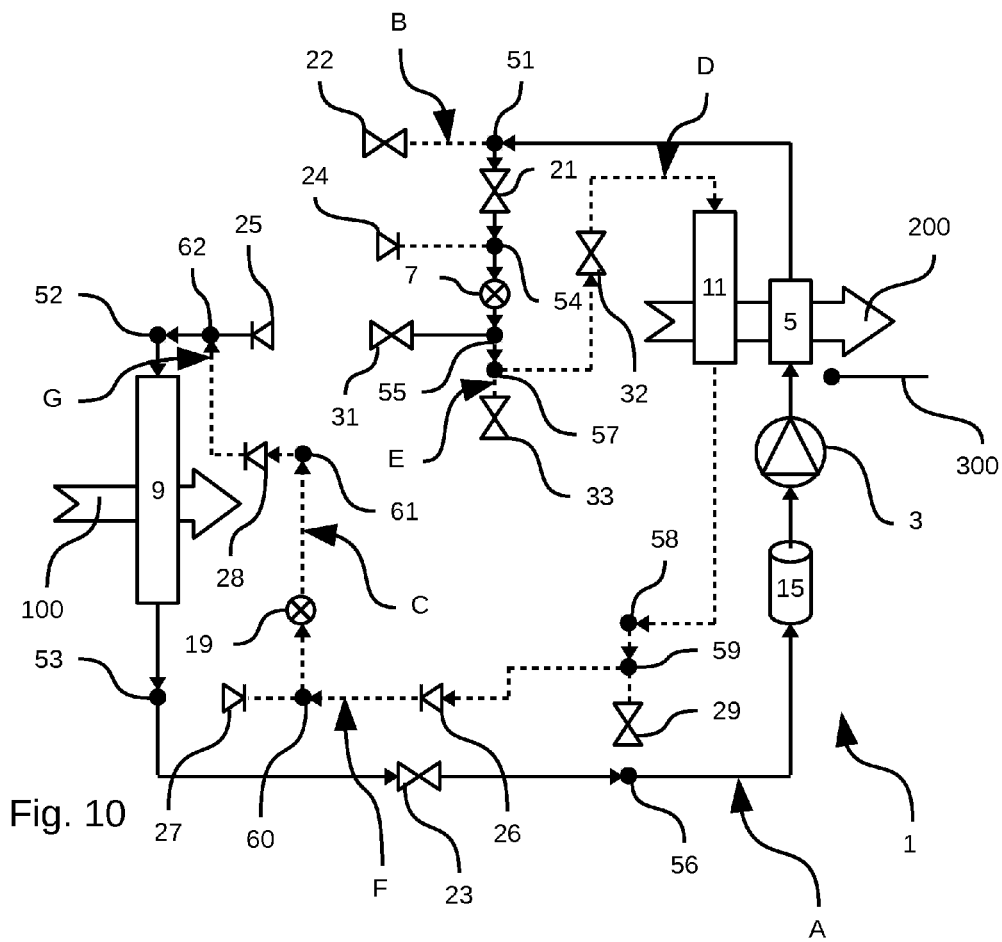

Further features and advantages of the invention will become more clearly apparent on reading the following description, which is given by way of non-limiting illustrative example, and from the appended drawings in which:

FIG. 1 is a schematic depiction of a thermal management device according to a first embodiment, FIGS. 2 to 7 show schematic depictions of the thermal management device of FIG. 1 according to different operating modes, FIG. 8 is a schematic depiction of a thermal management device according to a second embodiment, FIG. 9 is a schematic depiction of a thermal management device according to a third embodiment, FIG. 10 shows a schematic depiction of the thermal management device from FIG. 9 according to a particular operating mode.

In the various figures, identical elements bear the same reference numbers.

The following embodiments are examples. Although the description refers to one or more embodiments, this does not necessarily mean that each reference relates to the same embodiment, or that the features apply only to one embodiment. Single features of different embodiments can also be combined and/or interchanged in order to create other embodiments.

In the present description, some elements or parameters can be indexed, such as for example first element or second element, as well as first parameter and second parameter or even first criterion and second criterion, etc. In this case, this is simple indexing for differentiating and denoting elements or parameters or criteria that are similar but not identical. This indexing does not imply any priority of one element, parameter or criterion over another and such denominations can be easily interchanged without departing from the scope of the present description.

In the present description, "positioned upstream" is given to mean that an element is positioned before another with respect to the direction in which a fluid circulates. Conversely, "positioned downstream" is given to mean that an element is positioned after another with respect to the direction in which the fluid circulates.

FIG. 1 shows a reversible thermal management device 1 for a motor vehicle. This thermal management device 1 comprises a refrigerant fluid circuit in which a refrigerant fluid circulates. In the depiction of FIG. 1 and in the following figures, the refrigerant fluid circuit is in particular divided into a main loop A to which bypass branches B, C, D, E and F are connected. The choice of this main loop A is an arbitrary choice, used to facilitate comprehension of the different branches and the positions of the different elements relative to one another. The main loop A is shown as a solid line and the bypass branches B, C, D, E and F in dotted lines.

The main loop A comprises successively a compressor 3, an internal condenser 5, a first expansion device 7 and an external evaporator/condenser 9. The term "internal" here means that an internal air flow 200, itself intended to reach the passenger compartment of the motor vehicle, is intended to flow through the element concerned. The term "external" means that an external air flow 100 from the outside of the motor vehicle is intended to flow through the element concerned.

The refrigerant fluid is in particular intended to circulate in the compressor 3, the internal condenser 5, the first expansion device 7, and the external evaporator/condenser 9 in an operating mode described as "heat pump" mode which will be explained in more detail in the description below. This direction of circulation of the refrigerant fluid is taken into account arbitrarily to facilitate comprehension and define the terms "upstream" and "downstream".

Upstream of the compressor 3, the main loop A may comprise a phase separator 15.

The thermal management device 1 also comprises a first bypass branch B connecting a first connection point 51 to a second connection point 52. The first connection point is arranged on the main loop A upstream of the first expansion device 7, between said first expansion device 7 and the internal condenser 5. The second connection point 52 is arranged on the main loop A upstream of the external evaporator/condenser 9, between said external evaporator/condenser 9 and the first expansion device 7.

The thermal management device 1 also comprises a second bypass branch C connecting a third connection point 53 to a fourth connection point 54. The third connection point 53 is arranged on the main loop A downstream of the external evaporator/condenser 9, between said external evaporator/condenser 9 and the compressor 3. The fourth connection point 54 is arranged on the main loop A upstream of the first expansion device 7, between said first expansion device 7 and the first connection point 51.

The thermal management device 1 finally comprises a third bypass branch D connecting a fifth connection point 55 to a sixth connection point 56. The fifth connection point 55 is arranged on the main loop A downstream of the first expansion device 7, between said first expansion device 7 and the second connection point 52. The sixth connection point 56 is arranged on the main loop A upstream of the compressor 3, between said compressor 3 and the third connection point 53. This third bypass branch D in particular has at least one heat exchanger 11-13.

The thermal management device 1 also comprises a device for redirecting refrigerant fluid coming from the internal condenser 5 towards the first expansion device 7 or towards the first bypass branch B. This redirection device allows a choice of whether the refrigerant fluid coming from the internal condenser 5 is redirected towards the first expansion device 7 or towards the first bypass branch B, depending on the operating mode selected.

This redirection device may in particular be composed of two stop valves 21-22. A first stop valve 21 is arranged on the main loop A upstream of the first expansion device 7, between the first 51 and the fourth 54 connection points. A second stop valve 22 is arranged on the first bypass branch B. Depending on the opening or closure of the stop valves 21-22, it is thus possible to control the direction of the refrigerant fluid.

The thermal management device 1 also comprises various elements for controlling the circulation of refrigerant fluid, allowing operation in different operating modes.

The second bypass branch C thus comprises a first check valve 24 arranged so as to block the refrigerant fluid coming from the internal condenser 5, i.e. from the fourth connection point 54.

The main loop A comprises a stop valve 23 for refrigerant fluid, arranged between the third 53 and the sixth 56 connecting points. The main loop A also comprises a second check valve 25 arranged between the second 52 and the fifth 55 connecting points, so as to block the refrigerant fluid coming from the evaporator/condenser 9, i.e. from the second connection point 52.

The thermal management device 1 also comprises a device for redirecting the refrigerant fluid coming from the first expansion device 7 towards the at least one heat exchanger 11-13 of the third bypass branch D or towards the evaporator/condenser 9.

This device for redirecting the refrigerant fluid coming from the first expansion device 7 thus allows redirection of the refrigerant fluid which has passed through the first expansion device.

This device for redirecting the refrigerant fluid coming from the first expansion device 7 may in particular comprise:
 a first stop valve 31 arranged on the main loop A upstream of the evaporator/condenser 9, between the fifth connection point 55 and the second check valve 25,
 at least one other stop valve 32-33 arranged on the third bypass branch D upstream of the at least one heat exchanger 11-13, between the fifth connection point 55 and the at least one heat exchanger 11-13.

In the example illustrated in FIG. 1, the reversible thermal management device 1 comprises two heat exchangers 11-13 on the third bypass branch D. More precisely, these two heat exchangers 11-13 are connected in parallel with one another. Thus the third bypass branch D comprises an internal evaporator 11 and a cooler 13. This cooler 13 is arranged on a fourth bypass branch E connecting a seventh connection point 57 to an eighth connection point 58. The seventh connection point is arranged on the third bypass branch D downstream of the fifth connection point 55, between said fifth connection point 55 and the internal evaporator 11. The eighth connection point 58 is arranged on the third bypass branch D upstream of the sixth connection point 56, between said sixth connection point 56 and the internal evaporator 11.

In this example, the device for redirecting refrigerant fluid coming from the first expansion valve 7 is configured to redirect the fluid towards the evaporator/condenser 9 or towards the internal evaporator 11 and/or the cooler 13. For this, the device for redirecting the refrigerant fluid coming from the first heat exchanger 7 may in particular comprise:
 a second stop valve 32 arranged on the third bypass branch D upstream of the internal evaporator 11, between said internal evaporator 11 and the seventh connection point 57, and
 a third stop valve 33 arranged on the fourth bypass branch E upstream of the cooler 13, between said cooler 13 and the seventh connection point 57.

It should be noted that the invention is not limited to an example with one or two heat exchangers 11-13, and that it is possible to have a greater number of heat exchangers 11-13 on the third bypass branch D. The device for redirecting refrigerant fluid coming from the first expansion device 7 may be configured to control the distribution of refrigerant fluid for each of these heat exchangers 11-13.

The internal evaporator 11 may be more particularly arranged in the internal air flow 200 intended for the passenger compartment, in order to cool the latter.

The cooler 13 may for example be a cooler intended to cool elements such as batteries of an electric or hybrid motor vehicle. The cooler 13 may also for example be another evaporator placed in an internal air flow 200, for example in the case of multizone air conditioning.

The reversible thermal management device 1 may also comprise a heating, ventilation and air conditioning device, within which an internal airflow 200 is intended to circulate in the direction of the passenger compartment. Within this heating, ventilation and air conditioning device, the internal evaporator 11 and internal condenser 5 are arranged so as to carry the internal air flow 200. The internal evaporator 11 is more precisely arranged upstream of the internal condenser 5 in the circulation direction of the internal air flow 200.

The heating, ventilation and air conditioning device may also comprise a flap 300 arranged so as to block the internal air flow 200 so that it does not pass through the internal condenser 5. This flap 300 allows operation of the reversible thermal management device 1 in different operating modes, as described in more detail in the description below.

The device for redirecting refrigerant fluid coming from the first expansion device 7 is controlled via pulse width modulation signals. Thus in the example of FIG. 1 with an evaporator/condenser 9, an evaporator 11 and cooler 13, and with a device for redirecting refrigerant fluid coming from the first expansion device 7, comprising a first 31, a second 32 and a third 33 stop valve, the sum of the pulse width modulation signals controlling the stop valves 31-32-33 at an instant T is 100%, such that always at least one stop valve 31-32-33 is open. The stop valve 31-32-33 corresponding to the supply of refrigerant fluid to the heat exchanger 9, 11 or 13 which is used in the selected operating mode, will therefore be open.

FIGS. 2 to 7 show the reversible thermal management device 1 according to various operating modes. On these FIGS. 2 to 7, only the active elements are shown. The direction of circulation of the refrigerant fluid is indicated using arrows.

Figure 2:
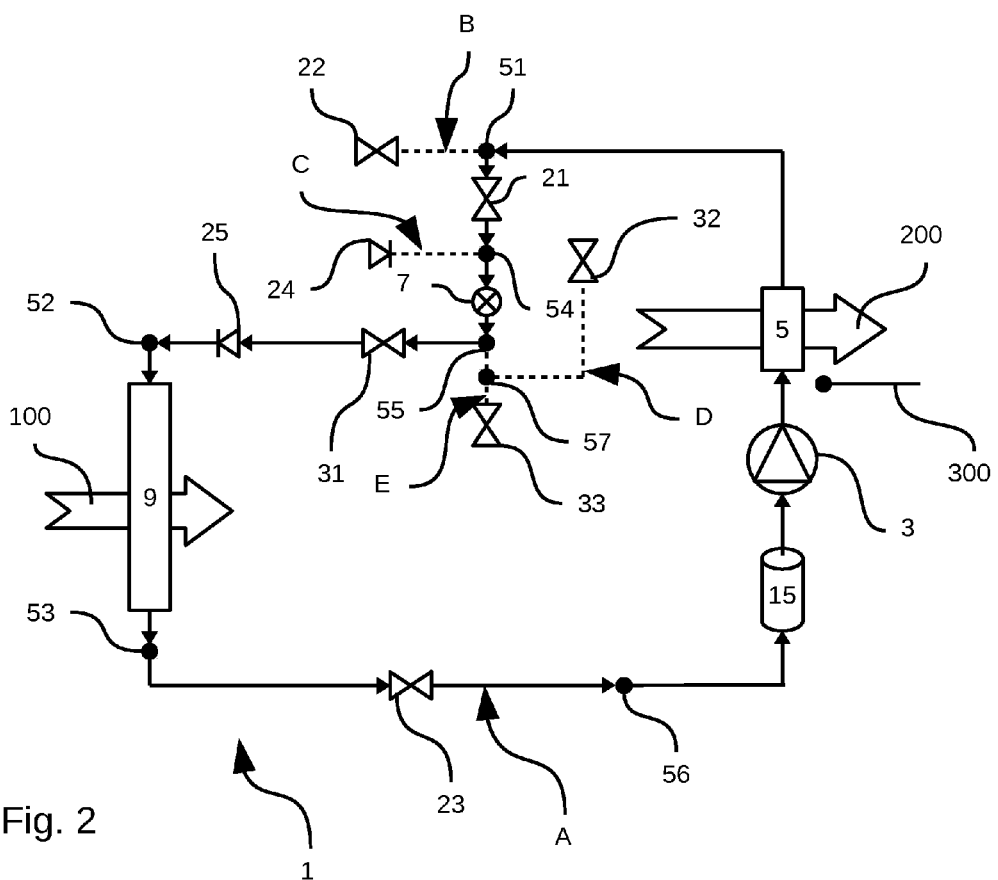

1) First Heat Pump Mode:

FIG. 2 shows the reversible thermal management device 1 in a first heat pump operating mode.

In this first heat pump mode, the refrigerant fluid firstly passes through the compressor 3 in which it undergoes a pressure increase. The refrigerant fluid then passes through the internal condenser 5 through which the internal air flow 200 passes. For this, the flap 300 is open. The refrigerant fluid transfers heat energy to the internal air flow 200 and then passes into the first expansion device 7 in which it undergoes a pressure fall. The refrigerant fluid then passes into the evaporator/condenser 9, in which it recovers heat energy from the external air flow 100. The refrigerant fluid then returns to the compressor 3.

In this first heat pump mode, the refrigerant fluid circulates only in the main loop A.

To allow this pathway, the device for redirecting refrigerant fluid coming from the internal condenser 5 redirects the refrigerant fluid towards the first expansion device 7. For this, its first stop valve 21 is open and its second stop valve 22 is closed.

This device for redirecting the refrigerant fluid coming from the first expansion device 7 redirects the refrigerant fluid towards the evaporator/condenser 9. For this, its first stop valve 31 is open and its second 32 and third 33 stop valves are closed.

The stop valve 23 is open.

This first heat pump mode allows heating of the internal air flow 200 and thus heating of the passenger compartment of the motor vehicle.

Figure 3:
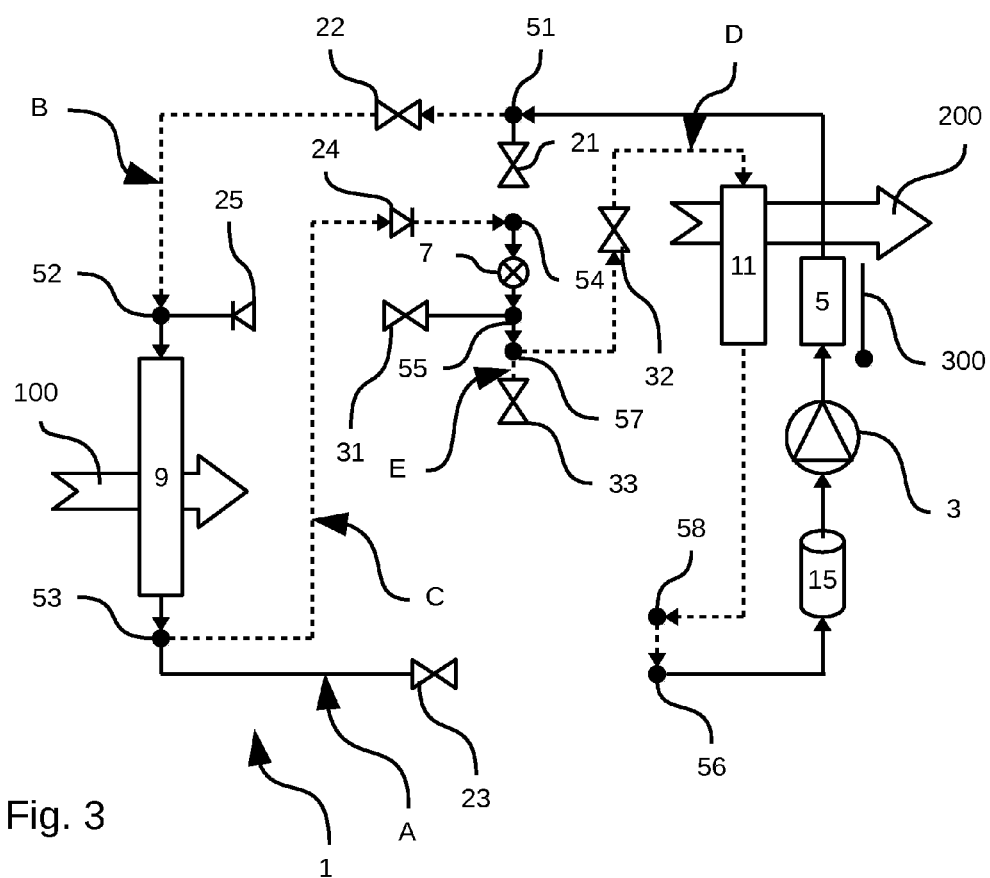

2) First Cooling Mode:

FIG. 3 shows the reversible thermal management device 1 in a first cooling operating mode.

In this cooling mode, the refrigerant fluid firstly passes through the compressor 3 in which it undergoes a pressure increase. The refrigerant fluid then passes through the internal condenser 5 through which the internal air flow 200 does not pass. For this, the flap 300 is closed. The refrigerant fluid then passes into the first bypass branch B and reaches the evaporator/condenser 9. The refrigerant fluid transfers heat energy to the external air flow 100 and then passes into the first expansion device 7 via the second bypass branch C. In the first expansion device 7, the refrigerant fluid undergoes a pressure fall. The refrigerant fluid then passes into the third bypass branch D and into the evaporator 11, in which it recovers heat energy from the external air flow 200. The refrigerant fluid then returns to the compressor 3.

To allow this pathway, the device for redirecting refrigerant fluid coming from the internal condenser 5 redirects the refrigerant fluid towards the first bypass branch C. For this, its first stop valve 21 is closed and its second stop valve 22 is open.

In this first cooling mode, the refrigerant fluid coming from the first expansion device 7 passes only through the evaporator 11. The device for redirecting the refrigerant fluid coming from the first expansion device 7 redirects the refrigerant fluid only towards the evaporator 11. For this, its first stop valve 31 is closed. Its second stop valve 32 is open and its third stop valve 33 is closed.

The stop valve 23 is closed.

In this first cooling mode, the reversible thermal management device 1 is used to cool only the internal airflow 200 and hence the passenger compartment.

Figure 4:
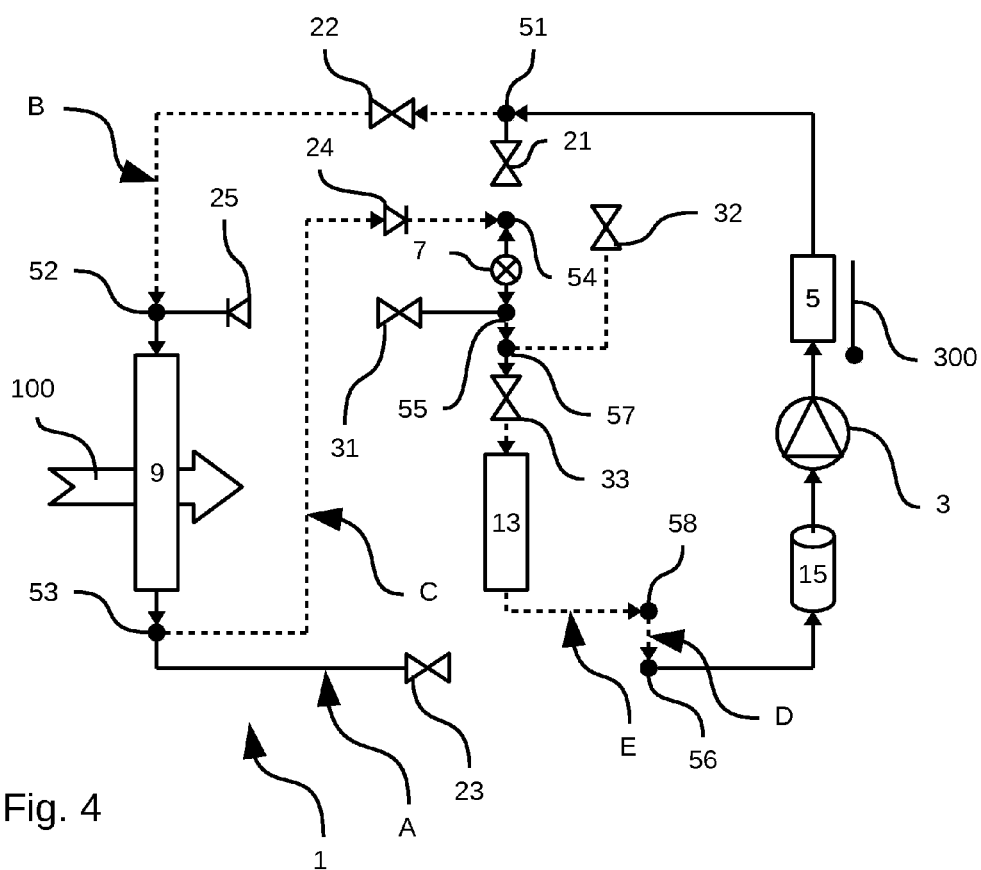

3) Second Cooling Mode:

FIG. 4 shows the reversible thermal management device 1 in a second cooling operating mode.

This second cooling mode is identical to the first cooling mode with the difference that, when leaving the first expansion device 7, the refrigerant fluid passes into the third bypass branch D and into the fourth bypass branch E in order to reach the cooler 13 instead of the evaporator 11. In the cooler 13, the refrigerant fluid recovers heat energy. The refrigerant fluid then returns to the compressor 3.

In this second cooling mode, the refrigerant fluid coming from the first expansion device 7 passes only through the cooler 13. The device for redirecting the refrigerant fluid coming from the first expansion device 7 redirects the refrigerant fluid only towards the cooler 13. For this, its first stop valve 31 is closed. Its second stop valve 32 is closed and its third stop valve 33 is open.

The stop valve 23 is closed.

In this second cooling mode, the reversible thermal management device 1 is used to cool only the element associated with the cooler 13, for example the batteries of a hybrid or electric motor vehicle.

Figure 5:
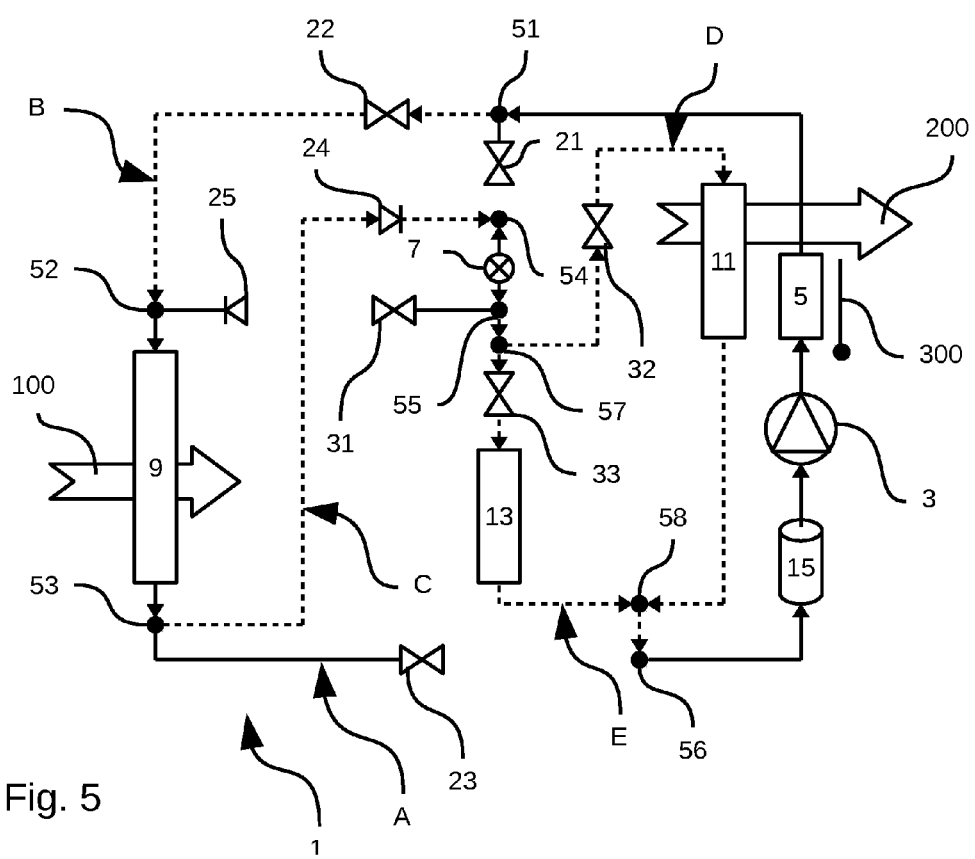

4) Mixed Cooling Mode:

FIG. 5 shows the reversible thermal management device 1 in a mixed cooling operating mode.

This mixed cooling mode is identical to the first and second cooling modes with the difference that, when leaving the first expansion device 7, the refrigerant fluid passes into the third bypass branch D and into the fourth bypass branch E in order to pass through both the cooler 13 and the evaporator 11. In the cooler 13 and the evaporator 11, the refrigerant fluid recovers heat energy. The refrigerant fluid then returns to the compressor 3.

In this mixed cooling mode, the refrigerant fluid coming from the first expansion device 7 passes through both the cooler 13 and the evaporator 11. The device for redirecting the refrigerant fluid coming from the first expansion device 7 redirects the refrigerant fluid simultaneously towards the cooler 13 and the evaporator 11. For this, its first stop valve 31 is closed. Its second 32 and third 33 stop valves are open.

The stop valve 23 is closed.

In this mixed cooling mode, the reversible thermal management device 1 is used to cool both the internal air flow 200 and the element associated with the cooler 13, for example the batteries of a hybrid or electric motor vehicle.

5) Dehumidification Mode:

FIG. 6a shows the reversible thermal management device 1 in a dehumidification operating mode.

In this dehumidification mode, the refrigerant fluid firstly passes through the compressor 3 in which it undergoes a pressure increase. The refrigerant fluid then passes through the internal condenser 5 which carries the internal air flow 200. For this, the flap 300 is open. The refrigerant fluid transfers heat energy to the internal air flow 200 and then passes into the first expansion device 7 in which it undergoes a pressure fall.

A first part of the refrigerant fluid then passes through the evaporator/condenser 9, in which it recovers heat energy from the external air flow 100.

A second part of the refrigerant fluid then passes into the third bypass branch D and into the evaporator 11, in which it recovers heat energy from the external air flow 200.

The refrigerant fluid then returns to the compressor 3.

To allow this pathway, the device for redirecting refrigerant fluid coming from the internal condenser 5 redirects the refrigerant fluid towards the first expansion device 7. For this, its first stop valve 21 is open and its second stop valve 22 is closed.

This device for redirecting the refrigerant fluid coming from the first expansion device 7 redirects the refrigerant fluid towards the evaporator/condenser 9 and towards the evaporator 11. For this, its first 31 and second 32 stop valves 31 are open and its third stop valve 33 is closed.

The stop valve 23 is open.

This dehumidification mode allows heating of the internal air flow 200 and thus heating of the passenger compartment of the motor vehicle. The dehumidification of the internal air flow 200 is achieved in that it undergoes a cooling before being reheated. This cooling causes condensation of the humidity contained in the internal air flow.

In this dehumidification mode, the refrigerant fluid circulates in the evaporator/condenser 9 and the evaporator 11 in parallel. It is however quite possible to imagine an alternative dehumidification mode, illustrated in FIG. 6b, in which the evaporator/condenser 9 and the evaporator 11 are arranged in series.

For this alternative dehumidification mode, the first bypass branch B comprises an expansion device. This expansion device may be a dedicated expansion device, or it may replace the second stop valve 22 and comprise a stop function.

In this alternative dehumidification mode, the refrigerant fluid leaving the internal condenser 5 passes through the first bypass branch B. For this, the first stop valve 21 is closed. The refrigerant fluid undergoes a first pressure fall in the expansion device of the first bypass branch B.

The refrigerant fluid then passes through the evaporator/condenser 9, in which it recovers heat energy from the external air flow 100. The refrigerant fluid then passes through the second bypass branch C. For this, the stop valve 23 is closed.

The refrigerant fluid passes through the first expansion device 7 in which it undergoes a second pressure fall. This device for redirecting the refrigerant fluid coming from the first expansion device 7 redirects the refrigerant fluid towards the evaporator 11. For this, its first 31 and third 33 stop valves are closed and its second stop valve 32 is open. In the evaporator 11, the refrigerant fluid recovers heat energy from the external air flow 200. The refrigerant fluid then returns to the compressor 3.

6) Heat Recovery Mode:

FIG. 7 shows the reversible thermal management device 1 in a heat recovery operating mode.

In this heat recovery mode, the refrigerant fluid firstly passes through the compressor 3 in which it undergoes a pressure increase. The refrigerant fluid then passes through the internal condenser 5 which carries the internal air flow 200. For this, the flap 300 is open. The refrigerant fluid transfers heat energy to the internal air flow 200 and then passes into the first expansion device 7 in which it undergoes a pressure fall. The refrigerant fluid passes through the third bypass branch D and the fourth bypass branch E, and into the cooler 13 in which it recovers heat energy.

The refrigerant fluid then returns to the compressor 3.

To allow this pathway, the device for redirecting refrigerant fluid coming from the internal condenser 5 redirects the refrigerant fluid towards the first expansion device 7. For this, its first stop valve 21 is open and its second stop valve 22 is closed.

The refrigerant fluid leaving the first expansion device 7 passes only through the cooler 13. The device for redirecting the refrigerant fluid coming from the first expansion device 7 redirects the refrigerant fluid only towards the cooler 13. For this, its first stop valve 31 is closed. Its second stop valve 32 is close and its third stop valve 33 is open.

The stop valve 23 is closed.

This heat recovery mode allows recovery of the heat energy at the element associated with the cooler 13, for example the batteries of a hybrid or electric motor vehicle, in order to heat the internal air flow 200.

In an alternative embodiment illustrated in FIG. 8, the reversible thermal management device 1 may comprise an internal heat exchanger 17. This internal heat exchanger 17 is arranged on one side on the second bypass branch C downstream of the first check valve 24, between said first check valve 24 and the fourth connection point 54, and on the other side on the main loop A upstream of the compressor 3, between said compressor 3 and the sixth connection point 56. This internal heat exchanger 17 thus allows the exchange of heat between the refrigerant fluid leaving the evaporator/condenser 9 and the refrigerant fluid leaving the at least one heat exchanger 11-13. This exchange of heat allows in particular an improvement of the performance coefficient of the reversible thermal management device 1 in certain operating modes.

As illustrated on FIG. 8, the reversible thermal management device 1 may also comprise a second expansion device 30 arranged on the third bypass branch D downstream of the at least one heat exchanger 11-13. This second expansion device 30, for example a tubular orifice with a stop function, allows a fall in the pressure of the refrigerant fluid leaving the heat exchanger 11-13 before it returns to the main loop A. This second expansion device 30 may in particular be arranged between the eighth 58 and the sixth 56 connection points. This second expansion device 30 is particularly useful for rebalancing the pressure of the refrigerant fluid in the case where the pressure of the refrigerant fluid leaving the evaporator/condenser 9 differs from that of the refrigerant fluid leaving the at least one heat exchanger 11-13, more precisely the evaporator 11 in dehumidification mode.

According to another embodiment illustrated on FIG. 9, the reversible thermal management device 1 may also comprise a device 29 for blocking the refrigerant fluid, arranged on the third bypass branch D downstream of the at least one heat exchanger 11-13. This blocking device 29 may for example be the second expansion device 30 if the latter comprises a stop function, or it may be simply a dedicated stop valve.

In another embodiment, the reversible thermal management device 1 also comprises a fifth bypass branch F connecting a ninth connection point 59 to a tenth connection point 60. The ninth connection point 59 is arranged on the third bypass branch D between the blocking device 29 and the at least one heat exchanger 11-13. The tenth connection point 60 is arranged on the second connection branch C between said first check valve 24 and the third connection point 53. This fifth bypass branch F also comprises a third check valve 26 arranged so as to block the refrigerant fluid coming from the tenth connection point 60.

The reversible thermal management device 1 also comprises a fourth check valve 27 arranged on the second bypass branch C between the third 53 and the tenth 60 connection points. This fourth check valve 27 is positioned so as to block the refrigerant fluid coming from the tenth connection point 60.

Furthermore, the thermal management device 1 comprises a sixth bypass branch G connecting an eleventh connection point 61 to a twelfth connection point 62. The eleventh connection point 61 is arranged on the second bypass branch C between the tenth connection point 60 and the first check valve 24. The twelfth connection point 62 is arranged on the main loop A downstream of the second check valve 25, between said second check valve 25 and the second connection point 52. This sixth bypass branch G also comprises a fifth check valve 28 positioned so as to block the refrigerant fluid coming from the twelfth connection point 62.

The reversible thermal management device 1 finally comprises a third expansion device 19 arranged on the second bypass branch C between the tenth 60 and the eleventh 61 connection points.

This other embodiment allows the thermal management device 1 to operate in a second heat pump mode, illustrated in FIG. 10, in which the evaporator 11 and the evaporator/condenser 9 function in series.

In this second heat pump mode, the refrigerant fluid firstly passes through the compressor 3 in which it undergoes a pressure increase. The refrigerant fluid then passes through the internal condenser 5 which carries the internal air flow 200. For this, the flap 300 is open. The refrigerant fluid transfers heat energy to the internal air flow 200 and then passes into the first expansion device 7 in which it undergoes a first pressure fall. The refrigerant fluid then passes into the third bypass branch D and into the evaporator 11, in which it recovers heat energy from the external air flow 200. The refrigerant fluid then reaches the second expansion device 19 on the second bypass branch C, passing through the fifth bypass branch F. At the second expansion device 17, the refrigerant fluid undergoes a second pressure fall. The refrigerant fluid then passes through the sixth bypass branch G to reach and pass through the evaporator/condenser 9, in which it recovers heat energy from the external air flow 100. The refrigerant fluid then returns to the compressor 3.

To allow this pathway, the device for redirecting refrigerant fluid coming from the internal condenser 5 redirects the refrigerant fluid towards the first expansion device 7. For this, its first stop valve 21 is open and its second stop valve 22 is closed.

This device for redirecting the refrigerant fluid coming from the first expansion device 7 redirects the refrigerant fluid towards the evaporator 11. For this, its first 31 and third 33 stop valves 31 are closed and its second stop valve 32 is open.

The stop valve 23 is open.
The blocking device 29 is closed.

This second heat pump mode allows heating of the internal air flow 200 and thus heating of the passenger compartment of the motor vehicle when the exterior temperature is below zero. The internal air flow 200 is then in recycling mode, i.e. the heating, ventilation and air conditioning device recycles the air from the passenger compartment in order to generate the internal air flow 200.

Thus it is clear that because of its architecture comprising a first expansion valve 7, the refrigerant fluid leaving which is redistributed by a dedicated redirection device, the reversible thermal management device 1 requires fewer elements, in particular expansion devices, and is therefore less costly. This is achieved while still allowing several essential operating modes.

The invention claimed is:

1. A reversible thermal management device for a motor vehicle, said thermal management device, comprising:
　a refrigerant fluid circuit in which a refrigerant fluid circulates, the circuit comprising:
　a main loop successively comprising a compressor, an internal condenser, a first expansion device and an external evaporator/condenser,
　a first bypass branch connecting a first connection point arranged on the main loop upstream of the first expansion device, between said first expansion device and the internal condenser, to a second connection point arranged on the main loop upstream of the external evaporator/condenser, between said external evaporator/condenser and the first expansion device,
　a second bypass branch connecting a third connection point arranged on the main loop downstream of the external evaporator/condenser, between said external evaporator/condenser and the compressor, to a fourth connection point arranged on the main loop upstream of the first expansion device, between said first expansion device and the first connection point,
　a third bypass branch connecting a fifth connection point arranged on the main loop downstream of the first expansion device, between said first expansion device and the second connection point, to a sixth connection point arranged on the main loop upstream of the compressor, between said compressor and the third connection point, said third bypass branch comprising at least one heat exchanger,
　a device for redirecting the refrigerant fluid coming from the internal condenser towards the first expansion device or towards the first bypass branch,
　a stop valve for the refrigerant fluid, arranged on the main loop between the third and the sixth connection points,
　a first check valve arranged on the second bypass branch so as to block the refrigerant fluid coming from the internal condenser,
　a second check valve arranged on the main loop between the second and the fifth connection points, so as to block the refrigerant fluid coming from the evaporator/condenser,
　a device for redirecting the refrigerant fluid coming from the first expansion device towards the at least one heat exchanger of the third bypass branch or towards the evaporator/condenser.

2. The reversible thermal management device as claimed in claim 1, wherein the device for redirecting the refrigerant fluid coming from the first expansion device comprises:
　a first stop valve arranged on the main loop upstream of the evaporator/condenser, between the fifth connection point and the second check valve,
　at least one other stop valve arranged on the third bypass branch upstream of the at least one heat exchanger, between the fifth connection point and the at least one heat exchanger.

3. The reversible thermal management device as claimed in claim 2, wherein the third bypass branch comprises an internal evaporator, the reversible thermal management device further comprising:
　a fourth bypass branch containing a cooler, said fourth bypass branch connecting a seventh connection point arranged on the third bypass branch downstream of the fifth connection point, between said fifth connection point and the internal evaporator, to an eighth connection point arranged on the third bypass branch upstream of the sixth connection point, between said sixth connection point and the internal evaporator,
　the device for redirecting refrigerant fluid coming from the first expansion device being configured to redirect the fluid towards the evaporator/condenser or towards the internal evaporator and/or the cooler.

4. The reversible thermal management device as claimed in claim 3, wherein the device for redirecting the refrigerant fluid coming from the first expansion device comprises:
　a second stop valve arranged on the third bypass branch upstream of the internal evaporator, between said internal evaporator and the seventh connection point, and
　a third stop valve arranged on the fourth bypass branch upstream of the cooler, between said cooler and the seventh connection point.

5. The reversible thermal management device as claimed in claim 4, further comprising:
- a heating, ventilation and air conditioning device inside which an internal air flow is configured to circulate in the direction of the passenger compartment,
- the internal evaporator and the internal condenser being arranged in said heating, ventilation and air conditioning device,
- said internal evaporator being arranged upstream of the internal condenser in the circulation direction of the internal air flow.

6. The reversible thermal management device as claimed in claim 5, wherein the heating, ventilation and air conditioning device comprises a flap arranged so as to block the internal air flow so that the internal air flow does not pass through the internal condenser.

7. The reversible thermal management device as claimed in claim 1, further comprising:
- an internal heat exchanger, said internal heat exchanger being arranged firstly on the second bypass branch downstream of the first check valve, between said first check valve and the fourth connection point, and secondly on the main loop upstream of the compressor, between said compressor and the sixth connection point.

8. The reversible thermal management device as claimed in claim 1, wherein the device for redirecting the refrigerant fluid coming from the first expansion device is controlled via pulse width modulation signals.

9. The reversible thermal management device as claimed in claim 1, further comprising:
- a second expansion device arranged on the third bypass branch downstream of the at least one heat exchanger.

10. The reversible thermal management device as claimed in claim 1, further comprising:
- a device for blocking the refrigerant fluid, arranged on the third bypass branch downstream of the at least one heat exchanger;
- a fifth bypass branch connecting a ninth connection point arranged on the third bypass branch between the blocking device and the at least one heat exchanger, to a tenth connection point arranged on the second connection branch between said first check valve and the third connection point, said fifth bypass branch comprising a third check valve so as to block the refrigerant fluid coming from the tenth connection point;
- a fourth check valve arranged on the second bypass branch between the third and the tenth connection points, so as to block the refrigerant fluid coming from the tenth connection point;
- a sixth bypass branch connecting an eleventh connection point arranged on the second bypass branch between the tenth connection point and the first check valve, to a twelfth connection point arranged on the main loop downstream of the second check valve, between said second check valve and the second connection point, said sixth bypass branch comprising a fifth check valve so as to block the refrigerant fluid coming from the twelfth connection point; and
- a third expansion device arranged on the second bypass branch between the tenth and eleventh connection points.

* * * * *